(12) United States Patent
Furet et al.

(10) Patent No.: US 10,968,901 B2
(45) Date of Patent: Apr. 6, 2021

(54) HYDRAULIC MACHINE AND REVERSIBLE METERING PUMP EQUIPPED WITH SUCH A MACHINE

(71) Applicant: DOSATRON INTERNATIONAL, Tresses (FR)

(72) Inventors: Sébastien Furet, Bordeaux (FR); Sandrine Lambinet, Sadirac (FR); David Vacher, Latresne (FR); Najib Laatiaoui, Begles (FR)

(73) Assignee: DOSATRON INTERNATIONAL, Tresses (FR)

( * ) Notice: Subject to any disclaimer, the term of this patent is extended or adjusted under 35 U.S.C. 154(b) by 92 days.

(21) Appl. No.: 15/767,322

(22) PCT Filed: Oct. 13, 2016

(86) PCT No.: PCT/EP2016/074611
§ 371 (c)(1),
(2) Date: Apr. 10, 2018

(87) PCT Pub. No.: WO2017/064197
PCT Pub. Date: Apr. 20, 2017

(65) Prior Publication Data
US 2018/0298888 A1    Oct. 18, 2018

(30) Foreign Application Priority Data

Oct. 13, 2015   (FR) ...................................... 15 59731

(51) Int. Cl.
*F04B 13/02*     (2006.01)
*F04B 7/00*      (2006.01)
(Continued)

(52) U.S. Cl.
CPC ................ *F04B 13/02* (2013.01); *F04B 5/02* (2013.01); *F04B 7/00* (2013.01); *F04B 15/04* (2013.01);
(Continued)

(58) Field of Classification Search
CPC .... F04B 13/02; F04B 5/02; F04B 7/00; F04B 15/04; F04B 19/22; F04B 53/1087;
(Continued)

(56) References Cited

U.S. PATENT DOCUMENTS 2,888,034 A * 5/1959 Glegg ........................ F16K 1/36
                                                        137/512.4
4,756,329 A     7/1988 Cloup
(Continued)

FOREIGN PATENT DOCUMENTS

EP       0 255 791 B1    12/1989
EP         151 196 A1    11/2001
(Continued)

OTHER PUBLICATIONS

International Search Report, dated Jan. 3, 2017, from corresponding PCT application No. PCT/EP2016/074611.

*Primary Examiner* — William M McCalister
(74) *Attorney, Agent, or Firm* — Nixon & Vanderhye (57) ABSTRACT

A hydraulic machine includes: a casing; a differential piston having an upper ring and a lower base, sliding reciprocally in the casing and a cylindrical housing inside the envelope, separating two chambers of the casing; a hydraulic switch conveying liquid to/from the chambers, the switch controlled by movement of the piston and including at least one rod acting on a distribution member that includes an upper valve cooperating with a first seat in the upper ring of the piston and at least one lower valve cooperating with a second seat in the lower base of the piston; and a trigger (Continued)

causing, at the end of the stroke, a sudden change in the position of the switch to reverse the stroke. The lower and upper valve seats accept upper and lower frustoconical portions and a lower frustoconical portion tapering in opposite directions. Also disclosed is a reversible metering pump.

18 Claims, 9 Drawing Sheets

(51) Int. Cl.
    *F04B 53/10*     (2006.01)
    *F04B 53/12*     (2006.01)
    *F16K 1/44*     (2006.01)
    *F04B 19/22*     (2006.01)
    *F04B 53/14*     (2006.01)
    *F04B 5/02*     (2006.01)
    *F04B 15/04*     (2006.01)

(52) U.S. Cl.
    CPC .......... *F04B 19/22* (2013.01); *F04B 53/1087* (2013.01); *F04B 53/12* (2013.01); *F04B 53/143* (2013.01); *F16K 1/443* (2013.01); *Y10T 137/2567* (2015.04)

(58) Field of Classification Search
    CPC ........ F04B 53/12; F04B 53/143; F16K 1/443; Y10T 137/2567

USPC .......................................... 251/364; 137/112
See application file for complete search history.

(56) References Cited

U.S. PATENT DOCUMENTS

| | | | |
|---|---|---|---|
| 5,505,224 A | 4/1996 | Urrutia et al. | |
| 6,684,753 B1 | 2/2004 | Urrutia | |
| 8,136,441 B2 | 3/2012 | Darbois et al. | |
| 8,522,820 B2* | 9/2013 | Biwanski | F16K 47/08 |
| | | | 137/625.3 |
| 8,646,478 B2* | 2/2014 | Nunez | F16K 1/02 |
| | | | 137/315.27 |
| 2010/0269685 A1* | 10/2010 | Darbois | F03C 1/26 |
| | | | 91/415 |
| 2013/0202456 A1* | 8/2013 | Lucas | F04B 13/02 |
| | | | 417/63 |
| 2015/0361994 A1* | 12/2015 | Furet | B01F 5/0428 |
| | | | 417/192 |

FOREIGN PATENT DOCUMENTS

| | | |
|---|---|---|
| FR | 2 789 445 A1 | 8/2000 |
| FR | 2 896 280 A1 | 7/2007 |
| WO | 00/47895 A1 | 8/2000 |

* cited by examiner

HYDRAULIC MACHINE AND REVERSIBLE METERING PUMP EQUIPPED WITH SUCH A MACHINE

The object of the invention is a hydraulic machine of the type including a casing, a differential piston having a large cross-section zone and a smaller cross-section zone, suitable for sliding in reciprocal movement respectively in the casing and in a cylindrical housing inside the casing. The piston separates the space inside the casing according to at least two chambers. The machine comprises hydraulic switching means for supplying liquid to and discharging liquid from the chambers separated by the piston, these switching means being controlled by the movements of the piston and able to adopt two stable positions. The machine also comprises triggering means capable of causing, at the end of the stroke of the piston, a sudden change in the position of the switching means, under the action of an elastic means, to reverse the stroke. A further object of the invention is a reversible metering pump including such a hydraulic machine.

BACKGROUND OF THE INVENTION

A hydraulic machine of this type is known, for example from the documents EP 0 255 791 B, U.S. Pat. No. 5,505,224 A or EP 1 151 196 A. This hydraulic machine can be used to drive a device for sucking an additive into a main liquid, which, in turn, provides drive for the machine.

However, for this type of hydraulic machine, the provision of an inlet and an outlet is known, each well defined, such that mixing between the additive and the main liquid generally takes place in a chamber called "mixing chamber", just before said mixture is discharged to the outlet. This configuration is effectively preferred since it avoids the mixture passing though the entire casing, this passage possibly causing, if the additive is aggressive or clogging, corrosion and/or clogging of the parts inside the casing. However, in a case where the additive has no corrosive and/or clogging characteristics, or in a case where the parts of the pump are not sensitive to the additive, it may be desirable, when the mixture exits into the dedicated chamber, for the mixture to circulate in the upper chamber then in the lower chamber before reaching the outlet. This configuration effectively enables better mixing between the additive and the main liquid.

This is why it is necessary to be able to use this hydraulic machine such that the arrival of the main liquid is interchangeable with the exit of the liquid mixed with the additive. This way, mixing between the additive and the main liquid still takes place in the mixing chamber but is discharged from the pump, either immediately after mixing without passing through the entire interior of the hydraulic machine, or after having passed through the entire interior of the machine.

SUMMARY OF THE INVENTION

To this effect, the object of the invention is a hydraulic machine, comprising:

a casing that extends longitudinally along an axis, and encloses a cylindrical housing coaxial to the casing, a differential piston having an upper ring and a lower base of a smaller cross-section, each suitable for sliding in reciprocating movement respectively in the casing and in the cylindrical housing, the piston and the cylindrical housing separating the interior of the casing according to a mixing chamber delimited by the cylindrical housing and the lower base of the piston, a chamber called "upper chamber" delimited by the upper ring and the casing cover, and a chamber called "lower chamber" delimited by the portion below the upper ring, the casing and the cylindrical housing, hydraulic switching means for supplying and discharging the chambers separated by the piston, these switching means being controlled by the movements of the piston and including at least one rod acting on a distribution member able to adopt two stable positions, said distribution member including a least one upper valve cooperating with a first seat made in the upper ring of the piston so as to allow communication between the upper chamber and the lower chamber and at least one lower valve cooperating with a second seat made in the lower base of the piston so as to allow communication between the upper chamber and the mixing chamber, triggering means comprising a push-piece suitable for causing, at the end of the stroke of the piston, a sudden change in the position of the switching means, under the action of an elastic means, to reverse the stroke, characterized in that the lower and upper valve seats respectively accept an upper frustoconical portion and a lower frustoconical portion tapering in opposite directions and each opening into one of the communicating chambers, such that the communication between the chambers is cut off when the associated valve closes off either one of the upper or lower frustoconical portions.

Optional characteristics of the invention, complementary or of substitution, are outlined below.

According to certain characteristics, the piston is equipped at its upper ring and at its lower base with removable sealing means.

According to other characteristics, at least one of the sealing means of the upper ring and of the lower base comprises a lip and an adapter respectively assembled and fastened on the circumferential surface of the ring and/or of the base, the lip being blocked in translation between a shoulder, disposed on the circumferential surface of the upper ring or of the lower base, and the adapter.

According to yet other characteristics, the fastening of the adapter comprises a "bayonet" type assembly making radial protrusions disposed on the inner circumferential surface of the adapter cooperate with corresponding peripheral grooves disposed on the outer circumferential surface of the upper ring of the piston, respectively of the base of the piston.

According to yet other characteristics, the fastening of the adapter furthermore comprises a lock that makes a strip, extending along the width of a window made in the thickness of the upper ring of the piston, respectively of the lower base, cooperate with a lug that extends radially from the inner circumferential surface of the adapter, such that during assembling of the bayonet type, the lug translates along the strip causing it to flex until it is embedded between the edge of the window and the end of the strip released from the support of the lug.

According to yet other characteristics, the lip has a frustoconical shape and preferably a V shaped cross-section.

According to yet other characteristics, the piston is molded in a single piece.

According to yet other characteristics, the piston is overmolded on an adhesion aid of a suction device.

A further object of the invention is a reversible metering pump comprising a hydraulic machine according to an embodiment of the invention, the pump being furthermore endowed with a suction device, a first pipe leading into the lower chamber, a second pipe and a sleeve each leading into the mixing chamber, the sleeve being connected at its other end with the suction device.

According to certain characteristics, the reversible metering pump is such that the upper valve is situated in the lower chamber, whereas the lower valve is situated in the upper chamber, the lower base and the upper ring each being equipped with frustoconical sealing lips, the taper of the lip surrounding the upper ring being turned towards the cover, whereas the taper of the lip surrounding the lower base is turned towards the suction device.

According to other characteristics, the upper valve is situated in the upper chamber whereas the lower valve is situated in the mixing chamber, the lower base and the upper ring being equipped with frustoconical sealing lips, the taper of the lip surrounding the upper ring being turned towards the suction device, whereas the taper of the lip surrounding the lower base is turned towards the cover.

BRIEF DESCRIPTION OF THE DRAWINGS

Other advantages and particularities of the invention will emerge on reading the detailed description of implementations and embodiments, not at all limitative, and the following attached drawings.

DETAILED DESCRIPTION OF THE PREFERRED EMBODIMENTS

Since the embodiments described below are not at all limitative, it is possible in particular to consider variants of the invention comprising only a selection of described characteristics, isolated from the other described characteristics (even if this selection is isolated within a sentence comprising these other characteristics) if this selection of characteristics is sufficient to confer a technical advantage or to differentiate the invention from the prior art. This selection comprises at least one characteristic, preferably functional without structural details, or with only a portion of the structural details if this portion alone is sufficient to confer a technical advantage or to differentiate the invention from the prior art.

For the purposes of conciseness and clarity, the elements have the same reference numbers on the different figures.

Figure 1A:
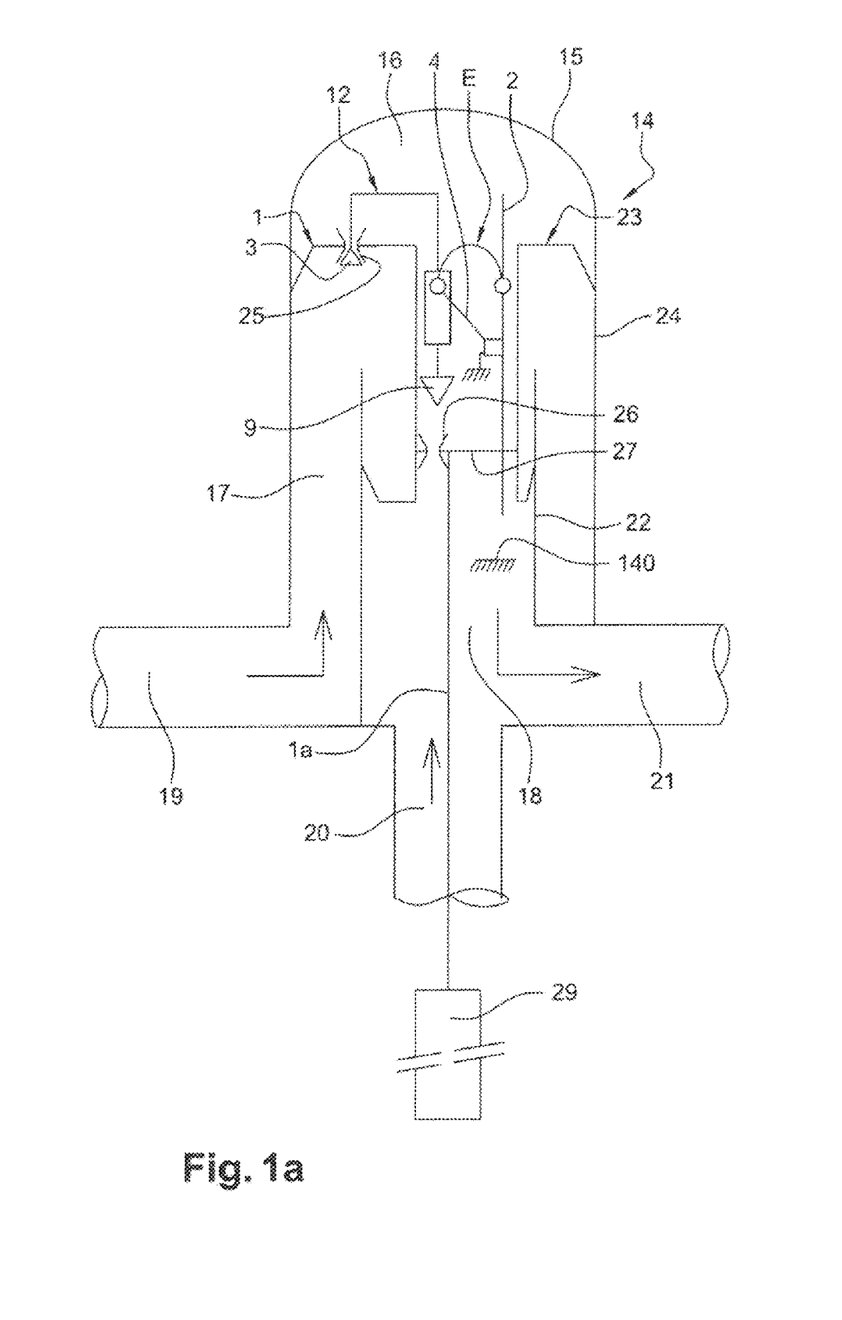
FIG. 1a is a diagrammatic illustration of a hydraulic machine according to a first functioning mode of the invention.
Figure 1B:
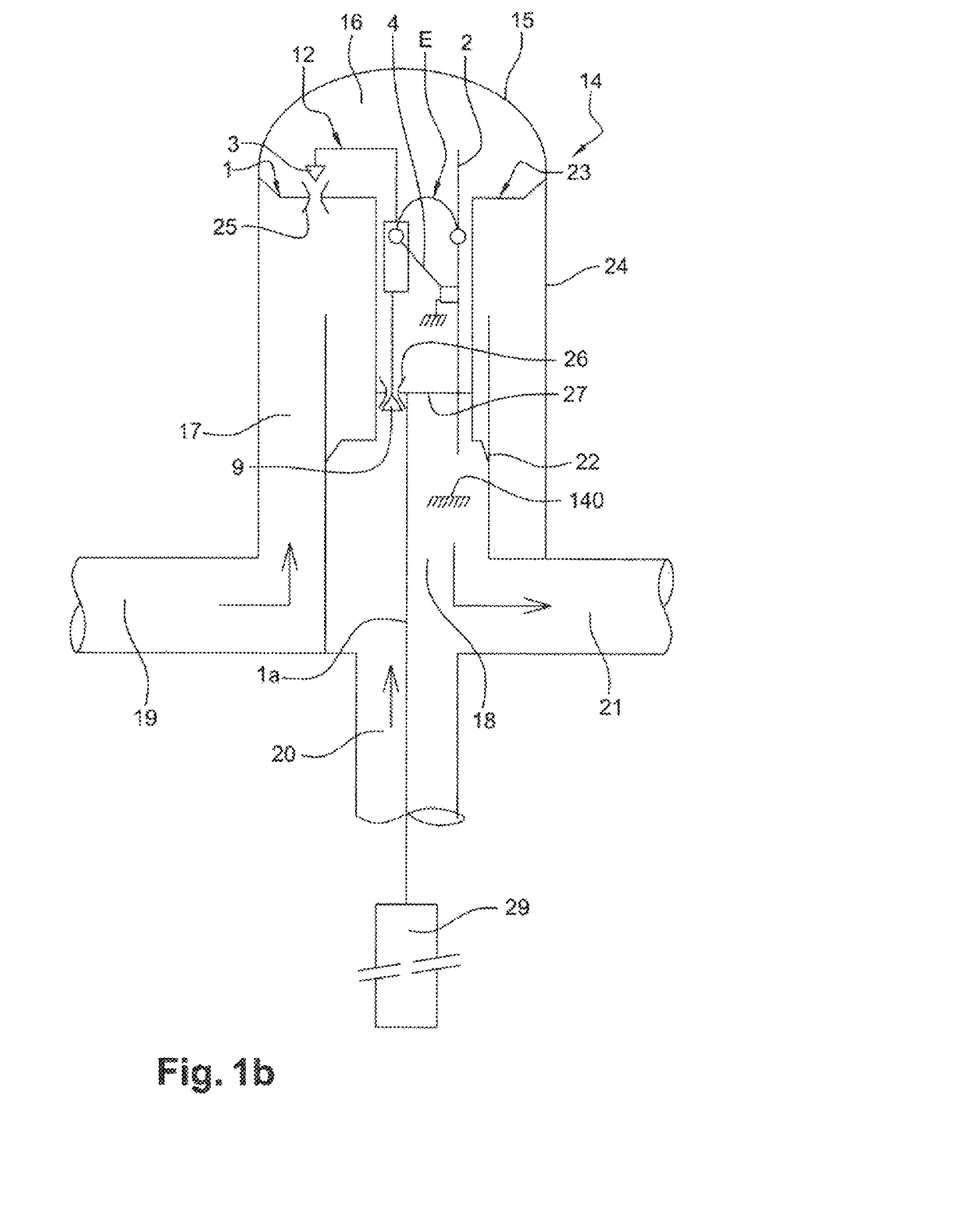
FIG. 1b is a diagrammatic illustration of a hydraulic machine according to a second functioning mode of the invention.
Figure 2:
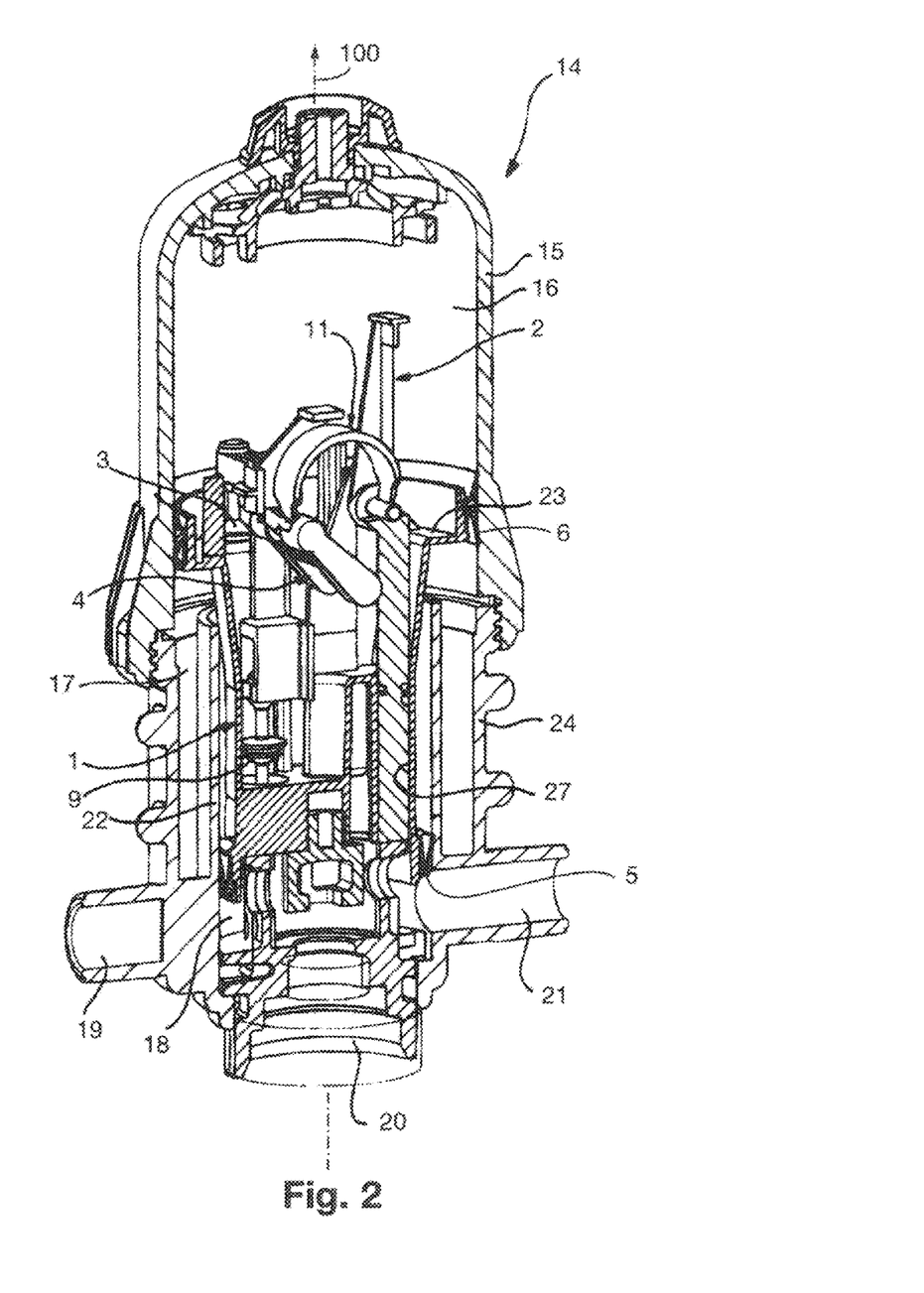
FIG. 2 is a longitudinal section in perspective of a hydraulic machine of an embodiment of the invention.

By referring to the drawings, in particular FIGS. 1 and 2, a hydraulic machine can be seen, comprising a differential hydraulic piston having reciprocating movement. The machine comprises a casing 14 consisting of a cylindrical body 24 that extends along an axis 100 and is surmounted by a cover 15 removably assembled on the body 24, in particular by screw fastening. A differential piston 1 is placed in the casing 14 so as to slide in reciprocating movement along the axis 100. The piston 1 includes, in the upper portion, an upper ring 23 having a large cross-section, whose periphery is supported in a sealed manner against the inner wall of the casing 14 thanks to a sealing piece. The barrel of the piston, coaxial to the casing 14 and of a smaller diameter than the upper ring 23 is integral with this ring and extends downwards (i.e. in the opposite direction to the cover). The lower portion of the barrel of the piston slides in a sealed manner in a cylindrical housing 22 coaxial to the casing 1. The barrel is closed at the lower portion by a lower base 27. The piston 1 and the cylindrical housing 22 separate the interior of the casing 14 according to a chamber 18 called "mixing chamber" delimited by the cylindrical housing 22 and the lower base 27 of the piston, a chamber 16 called "upper chamber" delimited by the upper ring 23 and the cover 15 of the casing, and a chamber 17 called "lower chamber" of a substantially annular shape, delimited by the portion below the upper ring 23, the casing 14 and the cylindrical housing 22.

The hydraulic machine comprises a first pipe 19 connecting the lower chamber 17 to the exterior, and a second pipe 21 connecting the mixing chamber 18 to the exterior. A cylindrical sleeve 20 coaxial to the casing 14 extends from the mixing chamber downwards so as to allow the mixing chamber to be connected to a suction device 29. This suction device is actuated by the hydraulic machine by means of a rod 1a of the piston, this rod connected in turn to a means for pumping additive (not illustrated on the figures). For further details relating to this type of device, reference may be made to the documents EP0255791 and EP1151196.

Hydraulic switching means are provided for supplying liquid to and discharging liquid from the chambers 16, 17, 18 separated by the piston. These switching means are controlled by the movements of the piston and include a rod 4 acting on a distribution member able to adopt two stable positions. More precisely, the distribution member comprises at least one valve holder 12 comprising at least one first valve 3 called "upper valve" cooperating with a first seat 25 made in the upper ring 23 of the piston, and at least one second valve 9 called "lower valve" cooperating with a second seat 26 made in the lower base 27 of the piston. The number of valves can vary, but it preferably numbers four.

The hydraulic machine furthermore includes triggering means comprising a push-piece 2 and suitable for causing, at the end of the stroke of the piston, by coming to bear against a stop, a sudden change in the position of the switching means, under the action of an elastic means E, so as to reverse the stroke of the piston. The coming to bear against a stop (not illustrated on the figures) takes place in the vicinity of the cover 15 so as to allow the piston to change its ascending stroke to descending stroke. The coming to bear against a stop 140 also takes place in the vicinity of the lower portion of the casing so as to allow the piston to change its descending stroke to ascending stroke.

The rod 4 is hinged at one end on a point fixed in relation to the piston 1, whereas the other end of the rod can move in a vertical window of the valve holder 12 and abut one of the two ends of this window, in one of the two stable positions of the distribution member. The elastic means E is integral, at each of its ends, with a hinge member accommodated respectively in a housing provided on the rod and on the push piece 2. Each housing is open along a direction substantially opposite the direction of the force exerted by the elastic means E in the wall of the housing concerned. This elastic means E can advantageously consist of a convex spring blade 11.

The valves 3, 9 are assembled on the valve holder 12 substantially having the shape of a frame (FIGS. 4 and 6), vertical in the functioning position of the hydraulic machine, and including on its two vertical sides ribs protruding towards the exterior, suitable for cooperating with guide grooves (not visible) provided in the piston 1. Advantageously, there are four upper valves 3 and four lower valves 9. The lower horizontal side of the frame includes two open housings allowing a coupling, with latching of the cylindrical rod of a valve, by translation perpendicular to the plane of the frame. The lower edges of each housing are accommodated, with some play, along a direction parallel to the piston axis, between two collars or discs integral with the valve rod. The valve per se consists of a disc including at its periphery a recess for accommodating a seal 13, 28.

The seat 25 of the valve 3 called "upper valve" is made through the upper ring 23 of the piston, such that it allows communication between the upper chamber 16 and the lower chamber 17. The seat of the upper valve extends along an axis substantially parallel to the axis 100 of the hydraulic machine, and accepts an upper frustoconical portion 25*a* and a lower frustoconical portion 25*c* tapering in opposite directions and each opening in one of the communicating chambers. The upper and lower frustoconical portions are connected by a central portion 25*b*.

The seat 26 of the valve 9 called "lower valve" is made in the lower base 27 of the piston, such that it allows communication between the upper chamber 16 and the mixing chamber 18. The seat of the lower valve extends along an axis substantially parallel to the axis 100 of the hydraulic machine, and accepts an upper frustoconical portion 26*a* and a lower frustoconical portion 26*c* tapering in opposite directions and each opening in one of the communicating chambers. The upper and lower frustoconical portions are connected by a central portion 26*b*. In other words, the cross-section of the frustoconical portions is maximum where these portions lead into their respective chambers.

When the cover 15 is removed, it is possible to gain access to the valve rods so as to latch them to or unlatch them from the valve holder.

The valve holder is advantageously formed as a single piece, which can be embodied in molded plastic material.

The functioning of the hydraulic machine is similar to that described in EP1151196, but with the particularity that this functioning is reversible.

Figure 3:
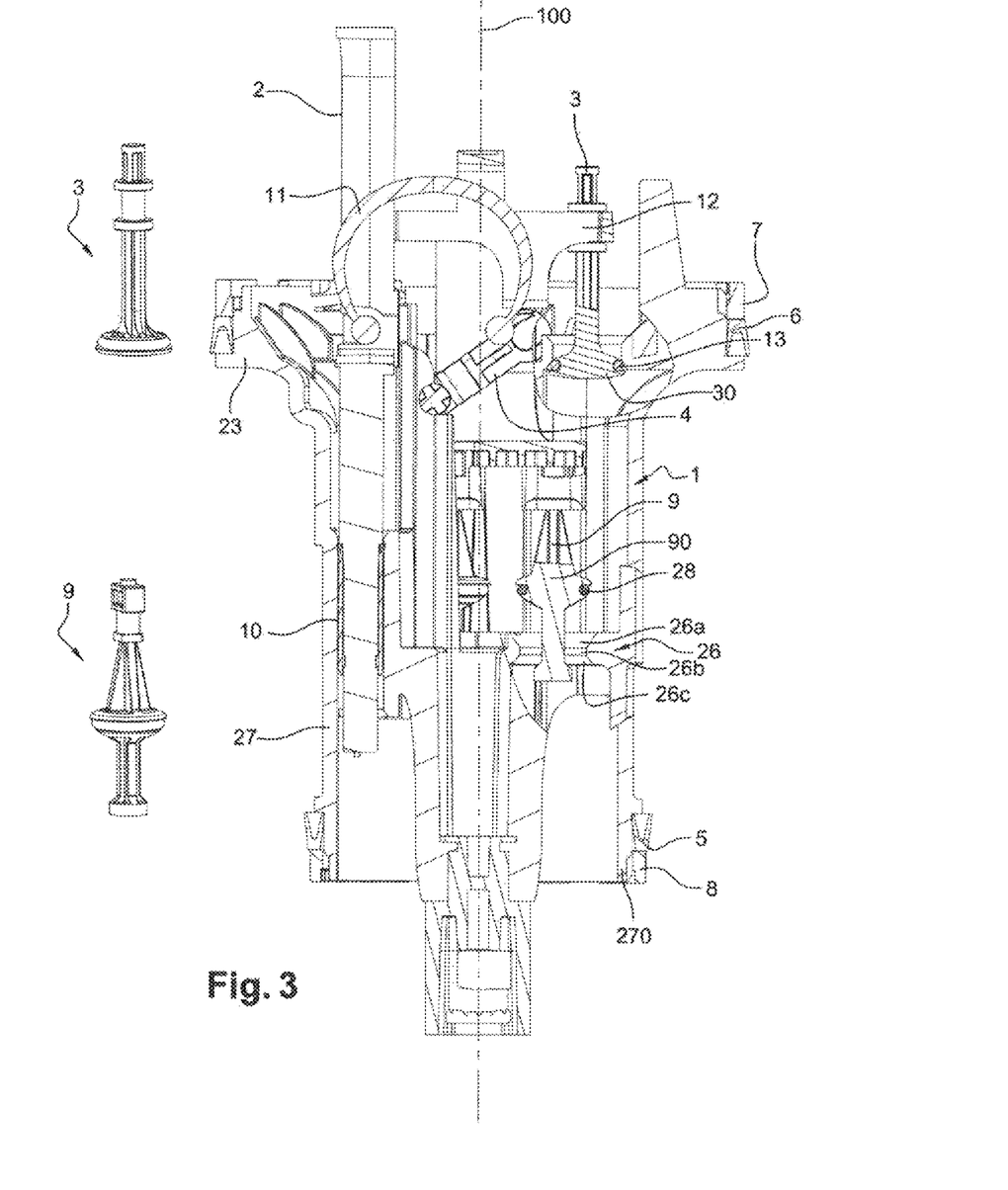
FIG. 3 is a front view of a longitudinal section of a hydraulic machine according to the first functioning mode of the invention.
Figure 6:
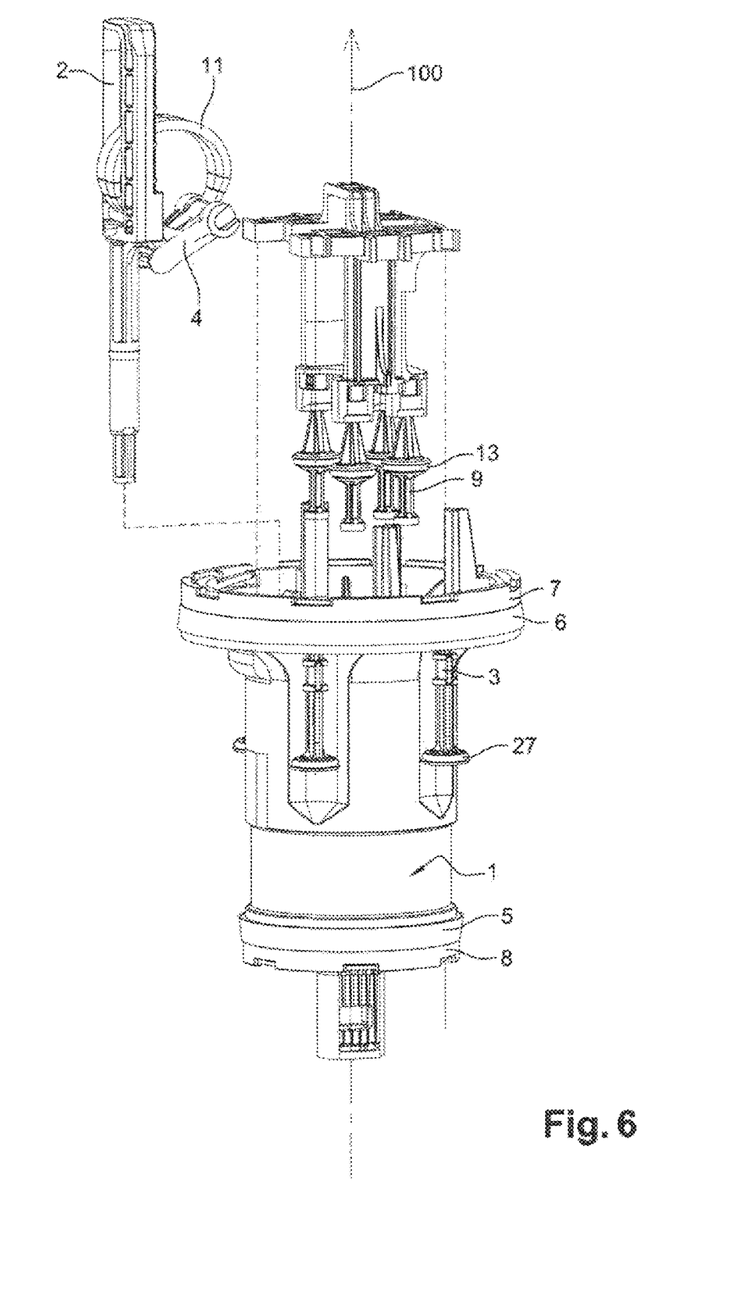
FIG. 6 is an exploded longitudinal section of a hydraulic machine according to the first functioning mode of the invention, FIGS. 7a, 7a', 7b, 7b', 7c, 7d are perspective illustrations of a detail of a hydraulic machine according to the invention, FIGS. 8a, 8a', 8b, 8b', 8c, 8d are perspective illustrations of another detail of a hydraulic machine according to the invention.

As illustrated on FIGS. 1, 3 and 6, the upper valves 3 are assembled as "through valves" in the upper ring 23 of the piston such that the base of the valves is situated inside the lower chamber 17. This results in the fact that the face of the base 30, which is situated towards the rod of the valve 3, is able to close off the frustoconical portion 25*c* made in the upper ring when said face abuts the frustoconical portion 25*c* of the seat 25 of the upper valves 3. Advantageously, an O-ring seal 13 can be accommodated in a circumferential groove made in the base 30 of the upper valves 3 so as to optimize sealing.

In contrast, the lower valves 9 are not assembled as "through valves" in the lower base 27 of the piston 1, such that the base 90 of the valves 9 is situated in the upper chamber. This results in the fact that the face of the base 90 opposite the face that is situated towards the rod of the valve 9 is able to close off the frustoconical portion 26*a* made in the base 27 when said face abuts the frustoconical portion 26*a* of the seat 26 of the lower valves 9. Advantageously, an O-ring seal 28 can be accommodated in a circumferential groove made in the base 90 of the lower valves 9 so as to optimize sealing.

According to this valve assembly configuration, the inlet of the hydraulic machine for the main liquid is situated at the first pipe 19, and the outlet for the mixture is situated at the second pipe 21.

According to the cycle associated with this configuration, the main pressurized liquid, generally water, enters the lower chamber 17 through the pipe 19. The upper valves 3 are closed, whereas the valves 9 are open, thus allowing the liquid to be discharged from the upper chamber to the mixing chamber 18, then the mixture to be evacuated to the outlet via the pipe 21. In effect, under the action of the pressure of the main liquid on the lower face of the upper ring of the piston, the latter starts an ascending stroke, which tends to reduce the volume of the upper chamber and therefore to drive the contents to the mixing chamber, since the communication is open.

At the end of the ascending stroke, the push-piece 2 comes to bear against a stop connected to the cover 15, which, under the effect of the spring blade 11, causes the rod 4 to tilt to the other low stable position, and the valve holder 12 to move to the base of the piston. The valves 9 close whereas the valves 3 open. The pressurized liquid can pass from the lower chamber 17 to the upper chamber 16, whose communication with the mixing chamber 18 is now cut off, and the movement of the piston is reversed. This movement is reversed because of the pressure of the main liquid on the lower base 27. At the end of the descending stroke, the push-piece 2 encounters, via its lower end, a stop 140 integral with the casing 14, which causes a new tilting of the rod 4 to the raised position and a movement of the valve holder 12 causing the valves 3 to close and the valves 9 to open. The movement of the piston 1 is once more reversed and the piston starts again along an ascending stroke.

In parallel, the reciprocating movement of the piston when supplying the hydraulic machine with liquid, makes it possible as an alternative to generate suction through the sleeve 20 to the mixing chamber 18. Hence, when the sleeve 20 is connected to a suction device 29, suction takes place of the additive, which is injected into the mixing chamber. The suction device generally includes at least one suction valve, which opens when the piston moves away from the sleeve (that is to say in ascending stroke), followed by an exiting expulsion via the pipe 21 with the first suction valve closing when the piston approaches the sleeve (that is to say in descending stroke).

According to the configuration described above, suction of the additive is concurrent with the expulsion of the main liquid from the upper chamber 16 to the mixing chamber 18. The expulsion as outlet from the pump via the pipe 21 therefore takes place just after the additive has been mixed with the main liquid. This configuration makes it possible to avoid the additive passing through the entire interior of the hydraulic machine. In particular, it makes it possible to limit the risks of clogging or corrosion inside the machine.

Figure 4:
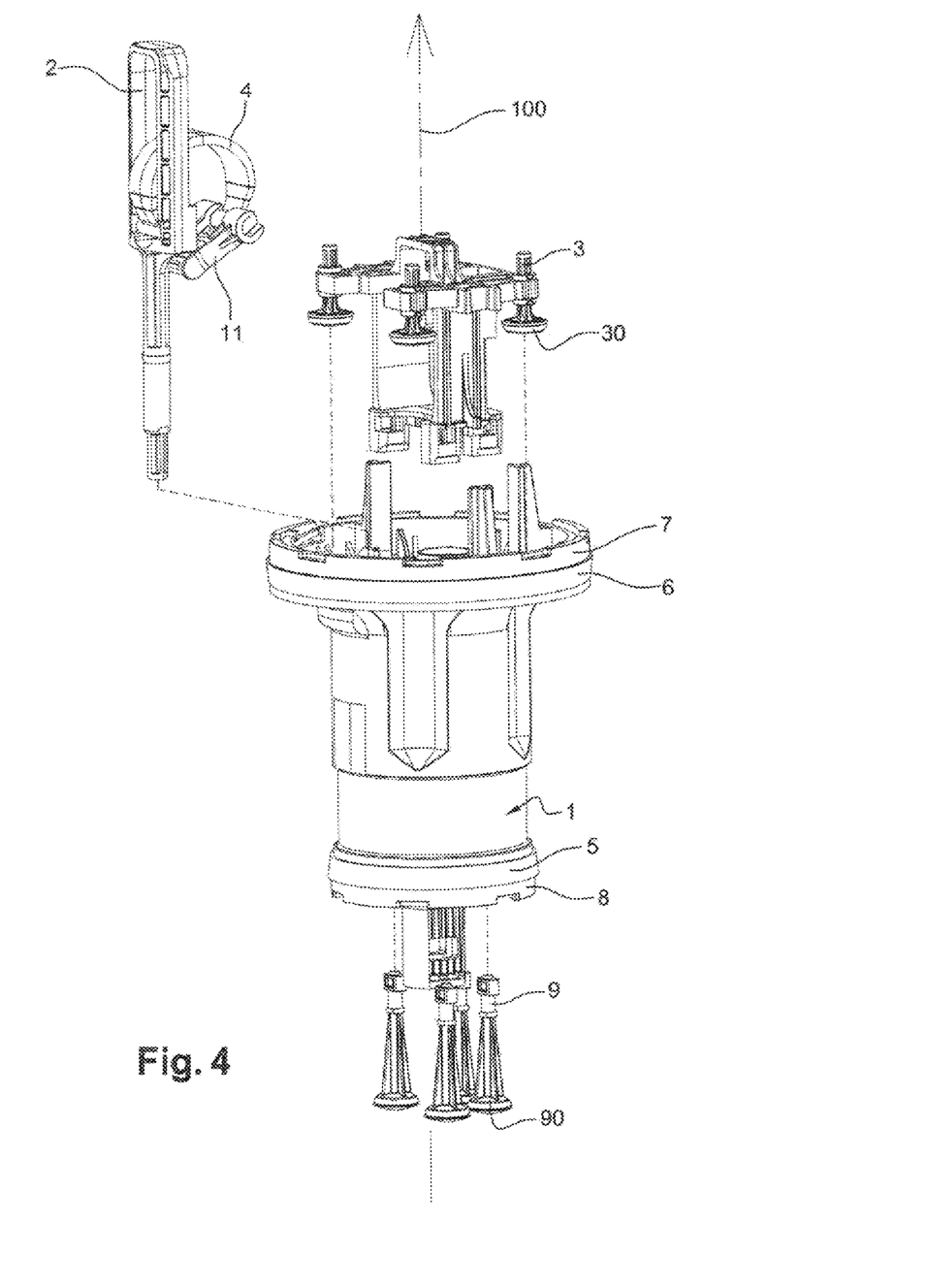
FIG. 4 is an exploded longitudinal section of a hydraulic machine according to the second functioning mode of the invention.
Figure 5:
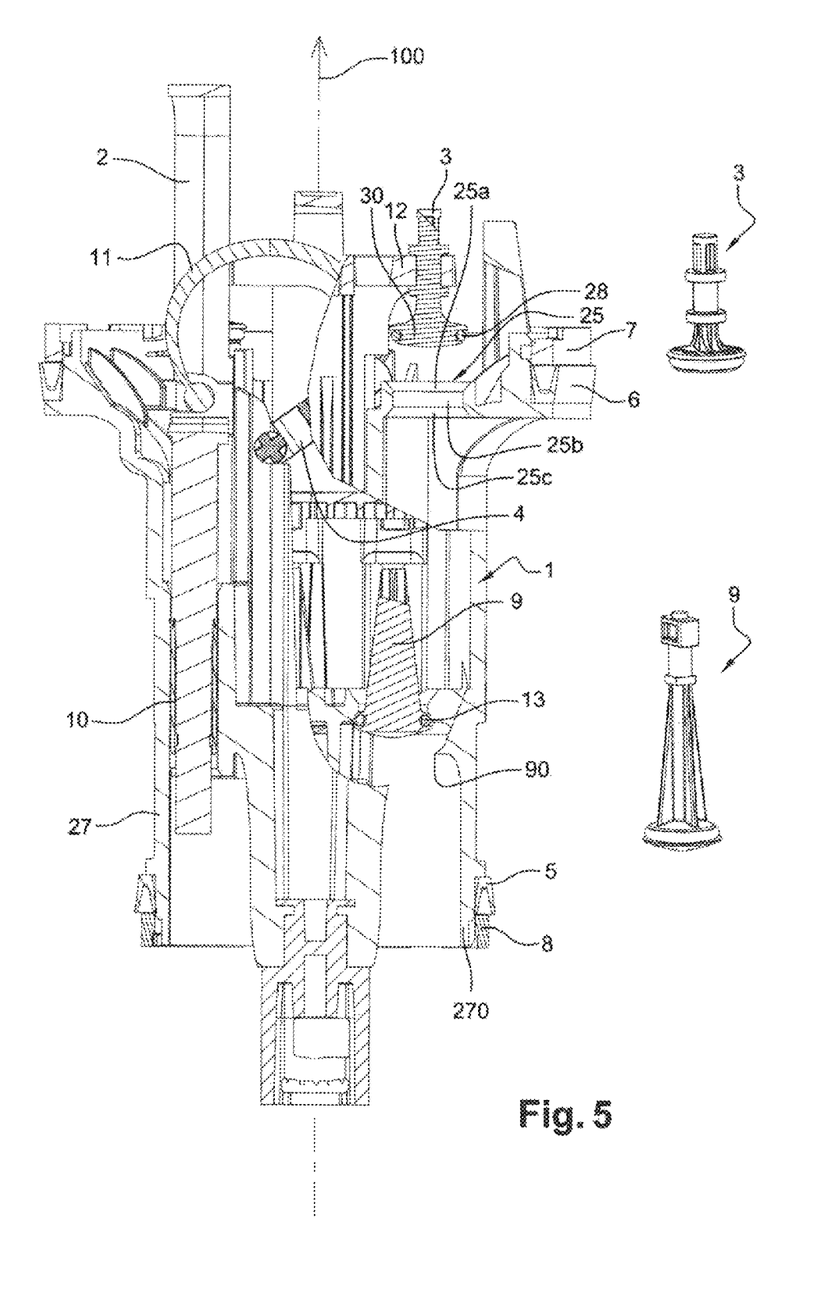
FIG. 5 is a front view of a longitudinal section of a hydraulic machine according to the second functioning mode of the invention.

According to another configuration and as illustrated on FIGS. 4 and 5, the upper valves 3 are no longer assembled as "through valves" in the upper ring 23 of the piston, since the base 30 of the upper valves 3 is situated in this configuration inside the upper chamber 16. This results in the fact that the face opposite that situated towards the rod of the base 30 of the valves 3 is able to close off the orifice made in the upper ring when said face bears against the frustoconical portion 25a of the seat 25 of the upper valves 3. Advantageously, an O-ring seal 13 can be accommodated in a circumferential groove made in the base of the upper valves 3 so as to optimize sealing.

Still according to this configuration, the lower valves 9 are assembled as "through valves" in the lower base 27 of the piston 1, such that the base 90 of the valves 9 is situated in the mixing chamber 18. This results in the fact that the face towards the rod of the base 90 of the valve 9 is able to close off the orifice made in the base 27 when said face bears against the frustoconical portion 26c of the seat 26 of the lower valves 9. Advantageously, an O-ring seal 28 can be accommodated in a circumferential groove made in the base of the lower valves 9 so as to optimize sealing.

According to this valve assembly configuration, the inlet of the hydraulic machine is situated at the second pipe 21, and the outlet is situated at the first pipe 19.

According to the cycle associated with this configuration, the main pressurized liquid, generally water, enters the mixing chamber 18 through the pipe 21. The lower valves 9 are closed, whereas the upper valves 3 are open, allowing the liquid to be discharged from the upper chamber 16 to the lower chamber 17, then the mixture to be evacuated to the outlet via the pipe 19. In effect, under the action of the pressure of the main liquid against the lower face of the upper ring of the piston, the latter starts an ascending stroke. With the volume of the upper chamber reducing, the mixture contained therein is evacuated via the open communication between the upper and lower chambers (upper valves 3 raised).

At the end of the ascending stroke, the push-piece 2 comes to bear against a stop connected to the cover 15, which, under the effect of the spring blade 11, causes the rod 4 to tilt to the other stable position, and the valve holder 12 to move in the direction of the base of the piston. The valves 3 close whereas the valves 9 open. The pressurized liquid passes into the upper chamber 16, which no longer communicates with the lower chamber 17, and the movement of the piston is reversed because the pressure is now exerted on the upper face of the lower base 27. At the end of the descending stroke, the push-piece 2 through its lower end encounters a stop 140 integral with the casing, which causes a new tilting of the rod 4 to the reverse position and a movement of the valve holder 12 causing the valves 9 to close and the valves 3 to open. The movement of the piston 1 is once more reversed and the piston starts again on an ascending stroke.

During the reciprocating movement of the piston driven by supplying the hydraulic machine with main liquid, suction through the sleeve 20 to the mixing chamber 18 is also generated by the reciprocating movement of the piston. Hence, when the piston moves away from the sleeve, the additive is sucked into the chamber 18 so as to be mixed with the main liquid entering via the pipe 21. Then, when the piston approaches the sleeve, the first suction valve closes and the mixture is expelled to the upper chamber 16.

The expulsion as outlet from the pump via the pipe 19 therefore takes place after the additive and the main liquid, mixed together in the chamber 18, have passed through the upper chamber and the lower chamber. This configuration guarantees a much higher quality of mixture than that obtained with the preceding configuration.

Advantageously, the hydraulic machine according to the invention can be made entirely in plastic material, including the blade 11, such that, with no metal parts, it has better resistance to chemical products. The number of constituent parts of the machine and the time for assembling these parts are also considerably reduced. Assembly and maintenance are simplified and made easier.

Advantageously, the material of said piston being a thermoplastic chosen from the list defined by the polypropylenes, the polyamides, the polyvinylidene fluorides, the piston preferably being overmolded on an adhesion aid of a suction device.

Advantageously, the piston 1 is equipped at its upper ring 23 and at its lower base 27 with removable sealing means. This way, maintenance is easy, since there is no need to change the complete piston when the sealing means are worn. This way, it is also possible to reverse the assembling of said sealing means when wishing to reverse the functioning of the hydraulic machine.

Figures 7A, 7B, 7C:
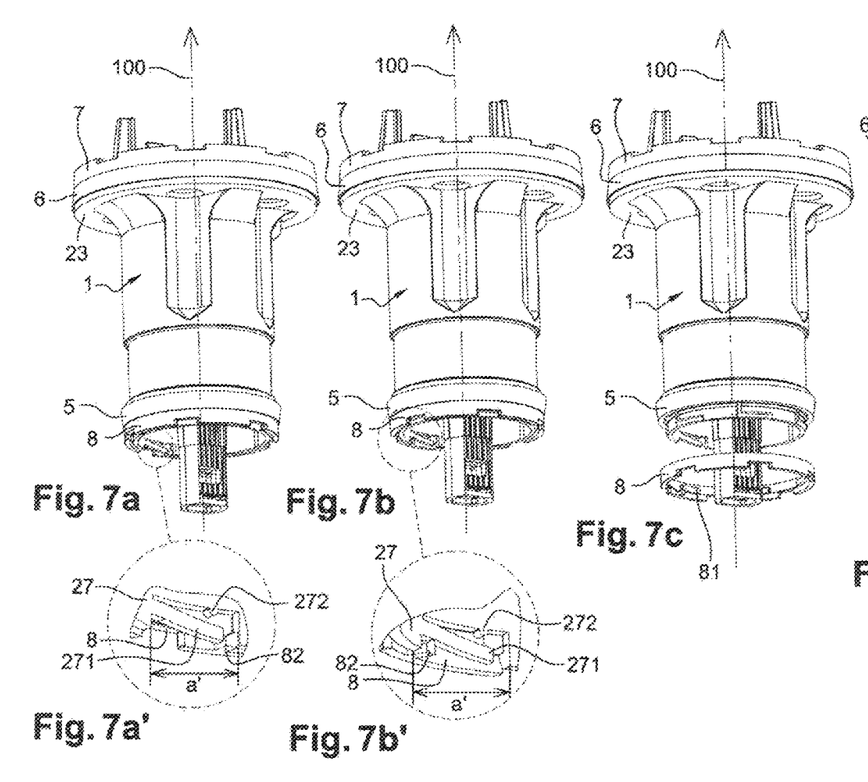
Figure 7D:
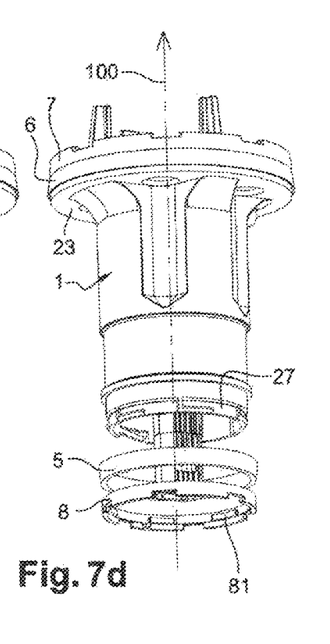

As illustrated on FIGS. 7a, 7a', 7b, 7b', 7c, 7d and 8a, 8a', 8b, 8b', 8c, 8d, the sealing means of the upper ring 23, respectively of the lower base, comprise a lip 5, 6 and an adapter 7, 8 respectively assembled and fastened on the circumferential surface of the ring and of the base, the lip being blocked in translation between a shoulder, disposed on the circumferential surface of the upper ring 23, respectively of the lower base 27, and the adapter.

According to a preferred arrangement illustrated on FIGS. 7a, 7b, 7c, 7d, the fastening of the adapter 8 comprises a "bayonet" type assembly, making radial protrusions 81, disposed on the inner circumferential surface of the adapter 8, cooperate with corresponding peripheral grooves disposed on the outer circumferential surface of the lower base 27. More precisely, the protrusions are suitable for cooperating with corresponding peripheral grooves provided on the outer surface of the lower base 27. Undercuts with generatrices parallel to the axis 100 of the hydraulic machine are provided on the outer periphery of the base 27 so as to make it possible to bring the radial protrusions opposite the lead-in to the peripheral grooves via a translation movement parallel to the axis of the piston. Then, via rotation around this axis of the piston, the protrusions 81 mesh with the grooves, and the adapter 8 is blocked. Removal of the rings is done rapidly via a reverse movement.

The sealing lip 5 is therefore blocked between a shoulder protruding on the outer circumferential surface of the base 27 of the piston 1 and the adapter 8.

Likewise, according to a preferred arrangement illustrated on FIGS. 8a, 8b, 8c, 8d, the fastening of the adapter 7 comprises a "bayonet" type assembly, making radial protrusions 71, disposed on the inner circumferential surface of the adapter 7, cooperate with corresponding peripheral grooves disposed on the outer circumferential surface of the upper ring 23. More precisely, the protrusions are suitable for cooperating with corresponding peripheral grooves provided on the outer surface of the upper ring 23. Undercuts with generatrices parallel to the axis of the piston are provided on the outer periphery of the ring 23 so as to make it possible to bring the radial protrusions opposite the lead-in to the peripheral grooves via a translation movement parallel to the axis of the piston. Then, via rotation around this axis of the piston, the protrusions 71 mesh with the grooves, and the adapter 7 is blocked. Removal of the rings is done rapidly via a reverse movement.

The sealing lip 6 is therefore blocked between a shoulder protruding on the outer circumferential surface of the upper ring 23 of the piston 1 and the adapter 7.

Advantageously, the "bayonet" type fastening of the adapters 7, 8 furthermore comprises a locking device aiming to prevent fortuitous uncoupling between the adapter and its support. In other words, this locking device makes it possible to prevent any turning of the adapter, hence causing the ribs to disengage from the grooves.

As illustrated on FIGS. 7a' and 7b', the locking device makes a strip 271, that extending along the width of a window made in the thickness of the lower base 27, cooperate with a lug 82 that extends radially from the inner circumferential surface of the adapter 8, such that during assembling of the bayonet type (on FIG. 7b') brought about by rotation around the axis 100 of the adapter 8 relative to the lower base 27, the lug translates along the strip, causing it to flex until it is embedded between the edge of the window and the end of the strip released from the support of the lug (see FIG. 7a'). The lug therefore travels a distance a'.

Advantageously, as it flexes, the strip 271 abuts a protuberance 272 disposed on the edge of the window of the lower base 27. This way, this protuberance forms a stop limiting the flexion of the strip 271. This way again, the lug 82 cannot go back because it also abuts the strip.

Figure 8A:
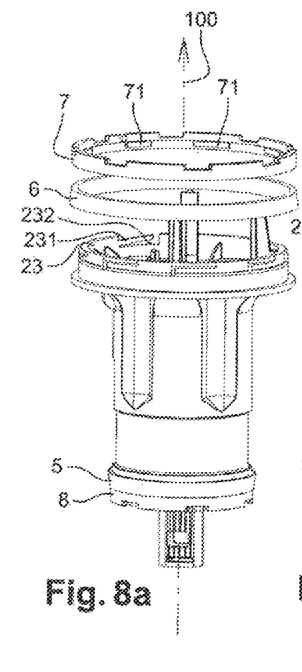

Likewise and as illustrated on FIGS. 8a' and 8b', the locking device makes a strip 231, extending along the width of a window made in the thickness of the upper ring 23, cooperate with a lug 72 that extends radially from the inner circumferential surface of the adapter 7, such that during assembling of the bayonet type (in FIG. 8b') brought about by rotation around the axis 100 of the adapter 7 relative to the upper ring 23, the lug translates along the strip, causing it to flex until it is embedded between the edge of the window and the end of the strip released from the support of the lug (see FIG. 8a'). The lug therefore travels a distance a.

Figures 8A, 8B, 8C:
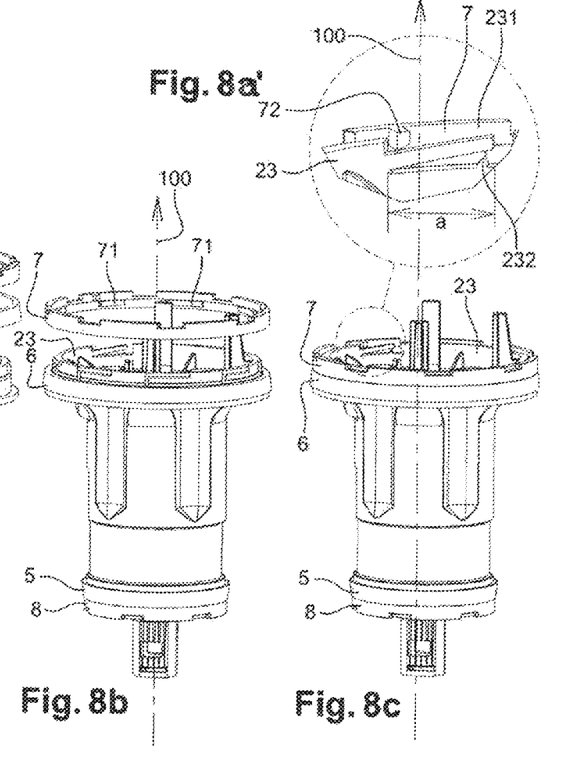
Figure 8B:
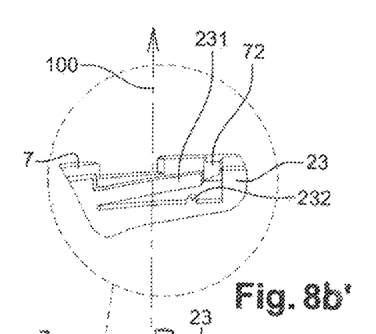
Figure 8D:
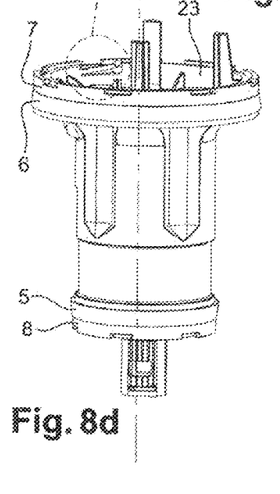

Advantageously, as it flexes, the strip 231 abuts a protuberance 232 provided on the edge of the window of the upper ring 23. This way, the lug 72 cannot go back because it also abuts the strip.

Advantageously, the lips 5 have a profile at the very least frustoconical over their outer circumferential surface. Advantageously, the profile of the lips can be V shaped.

In the case of the functioning mode wherein the mixture made between the main liquid and the additive is evacuated from the pump without passing through the upper chamber 16, followed by the lower chamber 17, the reversible metering pump is such that the upper valve is situated in the lower chamber whereas the lower valve is situated in the upper chamber.

In a preferred manner, the lower base and the upper ring are equipped with sealing lips with a V shaped profile, such that the taper of the lip of the upper ring is turned downwards, whereas the taper of the lip of the lower base is turned upwards. For more details concerning the V shaped profile of these sealing lips, reference shall be made to the document FR2896280A1 and FIG. 10 in particular.

In the case of the functioning mode wherein the mixture made between the main liquid and the additive is evacuated from the pump after passing through the upper chamber 16, followed by the lower chamber 17, the reversible metering pump is such that the upper valve is situated in the upper chamber whereas the lower valve is situated in the mixing chamber.

In a preferred manner, the lower base and the upper ring are equipped with sealing lips with a V shaped profile, such that the taper of the lip of the upper ring is turned downwards, whereas the taper of the lip of the lower base is turned upwards. For more details concerning the V shaped profile of these sealing lips, reference shall be made to the document FR2896280A1 and FIG. 10 in particular.

In summary, it emerges that the particularity of the double taper valve seats combined with the removable character of the lips, makes it possible to obtain a pump whose functioning is reversible. The fact of being able to reverse the inlet and the outlet according to need allows optimum use of the pump, since this use is matched to the additive. The reversible character also makes it possible to propose different options with very few specific parts, namely the valves alone.

Of course, the invention is not limited to the examples that have just been described and many developments can be brought to these examples without departing from the framework of the invention. Furthermore, the different characteristics, forms, variants and embodiments of the invention can be associated with each other according to diverse combinations as long as they are not incompatible with or exclusive of each other.

The invention claimed is:

1. A reversible hydraulic machine, comprising:
    a casing (14) that extends longitudinally along an axis (100), and enclosing a cylindrical housing (22) coaxial to the casing;
    a differential piston (1) having an upper ring (23) and a lower base (27) of a smaller cross-section, each of said upper ring and said lower base configured to slide in reciprocating movement respectively in the casing and in the cylindrical housing,
    the differential piston and the cylindrical housing separating an interior of the casing, which includes a mixing chamber (18) delimited by the cylindrical housing and the lower base of the piston, an upper chamber (16) delimited by the upper ring (23) and a cover (15) of the casing, and a lower chamber (17) delimited by a portion below the upper ring (23), the casing (14), and the cylindrical housing;
    hydraulic switching means for supplying and discharging the interior, upper, and lower chambers separated by the piston, said hydraulic switching means being controlled by movements of the piston and including a rod (4) acting on a distribution member (12) configured to adopt two stable positions, said distribution member including i) an upper valve (3) that cooperates with a first seat (25) located in the upper ring (23) of the piston so as to allow communication between the upper chamber and the lower chamber, and ii) a lower valve (9) that cooperates with a second seat (26) located in the lower base (27) of the piston so as to allow communication between the upper chamber and the mixing chamber; and
    triggering means comprising a push-piece (2) that causes, at an end of a stroke of the piston, a sudden change in a position of the hydraulic switching means, under action of an elastic means (E), to reverse the stroke,
    wherein the piston (1) is equipped at the upper ring (23) and at the lower base (27) with first and second removable sealing means (5,6), respectively, said first and second removable sealing means each being reversible for reversing a functioning of the machine,
    wherein the first valve seat (25) accepts a first upper frustoconical portion (25a) and a first lower frustoconical portion (25c), said first upper and lower frustoconical portions tapering in opposite directions and opening respectively into one of the upper chamber and the lower chamber,
    wherein the second valve seat (26) accepts a second upper frustoconical portion (26a) and a second lower frustoconical portion (26c), said second upper and lower frustoconical portions tapering in opposite directions and opening respectively into one of the upper chamber and the mixing chamber, wherein communication between the chambers stops when the associated valve closes off either one of the upper or lower frustoconical portions, and wherein:
the second lower frustoconical portion (26*c*) of the second valve seat (26) is closed when the first upper frustoconical portion (25*a*) of the first valve seat (25) is open, or the second upper frustoconical portion (26*a*) of the second valve seat (26) is closed when the first lower frustoconical portion (25*c*) of the first valve seat (25) is open, or the second lower frustoconical portion (26*c*) of the second valve seat (26) is open when the first upper frustoconical portion (25*a*) of the first valve seat (25) is closed, or the second upper frustoconical portion (26*a*) of the second valve seat (26) is open when the first lower frustoconical portion (25*c*) of the first valve seat (25) is closed.

2. The hydraulic machine as claimed in claim 1, wherein at least one of the first and second removable sealing means respectively of the upper ring and of the lower base comprises a lip (5, 6) and an adapter (7, 8) assembled and fastened on a circumferential surface of the upper ring and/or of the lower base of the piston, the lip being blocked in translation between the adapter and a shoulder disposed on the circumferential surface of the upper ring or of the corresponding lower base.

3. The hydraulic machine as claimed in claim 2, wherein a fastening of the adapter comprises a "bayonet" type assembly with radial protrusions (71, 81), disposed on an inner circumferential surface of the adapter, said radial protrusions configured to cooperate with corresponding peripheral grooves disposed on an outer circumferential surface of the upper ring or of the corresponding lower base.

4. The hydraulic machine as claimed in claim 3, wherein the fastening of the adapter comprises a lock that includes a strip, extending along the width of a window made in the thickness of the upper ring, of the corresponding base, which cooperates with a lug that extends radially from the inner circumferential surface of the adapter, such that assembling the "bayonet" type assembly includes translation of the lug along the strip so as to cause the strip to flex until the strip is embedded between the edge of the window and an end of the strip is released from a support of the lug.

5. The hydraulic machine as claimed in claim 2, wherein outer circumferential surfaces of the lips of the sealing means are frustoconical.

6. The hydraulic machine as claimed in claim 1, wherein the piston is molded in a single piece that is formed of a thermoplastic chosen from the group consisting of the polypropylenes, the polyamides, and the polyvinylidene fluorides.

7. The hydraulic machine as claimed in claim 6, wherein the piston is overmolded on an adhesion aid of a suction device (29).

8. A reversible metering pump comprising a hydraulic machine according to claim 1, the pump being equipped with a suction device (29), a first pipe (19) leading into the lower chamber (17), a second pipe (21) leading into the mixing chamber (18), and a cylindrical sleeve (20) coaxial to the casing (14) that extends from the mixing chamber to the exterior so as to allow connection to the suction device (29).

9. The reversible metering pump as claimed in claim 8, wherein the upper valve (3) is situated in the lower chamber (17),
wherein the lower valve (9) is situated in the upper chamber (16),
wherein the first and second sealing means (5,6) of the lower base (27) and the upper ring (23) are respectively equipped with sealing lips each having frustoconical outer circumferential surfaces, and
wherein in a first configuration, a taper of the lip (6) of the upper ring (23) is turned towards the cover, and a taper of the lip (5) of the lower base (27) is turned towards the suction device, the first and second sealing means being reversible so that in a reversed second configuration, the taper of the lip (6) of the upper ring (23) is turned towards the suction device, and the taper of the lip (5) of the lower base (27) is turned towards the cover.

10. The reversible metering pump as claimed in claim 8, wherein the upper valve (3) is situated in the upper chamber (16),
wherein the lower valve (9) is situated in the mixing chamber (18),
wherein the lower base (27) and the upper ring (23) are each equipped with sealing lips (5,6) having frustoconical outer circumferential surfaces, and
wherein a taper of the lip (6) of the upper ring (23) is turned towards the suction device, and a taper of the lip (5) of the lower base (27) is turned towards the cover.

11. The hydraulic machine as claimed in claim 3, wherein outer circumferential surfaces of the lips of the sealing means are frustoconical.

12. The hydraulic machine as claimed in claim 4, wherein outer circumferential surfaces of the lips of the sealing means are frustoconical.

13. The hydraulic machine as claimed in claim 5, wherein the lips have a V shaped profile in section.

14. The hydraulic machine as claimed in claim 2, wherein the piston is molded in a single piece that is formed of a thermoplastic chosen from the group consisting of the polypropylenes, the polyamides, and the polyvinylidene fluorides.

15. The hydraulic machine as claimed in claim 3, wherein the piston is molded in a single piece that is formed of a thermoplastic chosen from the group consisting of the polypropylenes, the polyamides, and the polyvinylidene fluorides.

16. The reversible metering pump of claim 10, wherein the lips have a V shaped profile.

17. The reversible metering pump of claim 9, wherein the lips have a V shaped profile.

18. The hydraulic machine as claimed in claim 1,
wherein the first and second sealing means (5,6) of the lower base (27) and the upper ring (23) are respectively equipped with sealing lips each having frustoconical outer circumferential surfaces, and
wherein in a first configuration, a taper of the lip (6) of the upper ring (23) is turned towards the cover, and a taper of the lip (5) of the lower base (27) is turned away from the cover, the first and second sealing means being reversible so that in a reversed second configuration, the taper of the lip (6) of the upper ring (23) is turned away from the cover, and the taper of the lip (5) of the lower base (27) is turned towards the cover.

\* \* \* \* \*